United States Patent
Lee et al.

(10) Patent No.: US 10,714,743 B2
(45) Date of Patent: Jul. 14, 2020

(54) METHOD FOR MANUFACTURING ELECTRODE INCLUDING POLYMER ELECTROLYTE AND ELECTRODE OBTAINED THEREBY

(71) Applicant: LG CHEM, LTD., Seoul (KR)

(72) Inventors: Jung-Pil Lee, Daejeon (KR); Hyea-Eun Han, Daejeon (KR); Eun-Bee Kim, Daejeon (KR); Ji-Young Kim, Daejeon (KR); Eun-Kyung Mok, Daejeon (KR); Hye-Ri Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 46 days.

(21) Appl. No.: 16/312,233

(22) PCT Filed: Mar. 6, 2018

(86) PCT No.: PCT/KR2018/002651
§ 371 (c)(1),
(2) Date: Dec. 20, 2018

(87) PCT Pub. No.: WO2018/164455
PCT Pub. Date: Sep. 13, 2018

(65) Prior Publication Data
US 2019/0237757 A1    Aug. 1, 2019

(30) Foreign Application Priority Data

Mar. 6, 2017 (KR) .................. 10-2017-0028342
Mar. 8, 2017 (KR) .................. 10-2017-0029660

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/0416* (2013.01);
(Continued)

(58) Field of Classification Search
CPC .. H01M 4/366; H01M 10/0565; H01M 4/139; H01M 4/0404; H01M 4/0407
See application file for complete search history.

(56) References Cited

U.S. PATENT DOCUMENTS 5,714,277 A    2/1998 Kawakami
2004/0146781 A1    7/2004 Ohsawa et al.
(Continued)

FOREIGN PATENT DOCUMENTS

JP    H6-283206 A    10/1994
JP    H10-172615 A    6/1998
(Continued)

OTHER PUBLICATIONS

International Search Report for PCT/KR2018/002651 (PCT/ISA/210) dated Jun. 28, 2018.
(Continued)

*Primary Examiner* — Stewart A Fraser
(74) *Attorney, Agent, or Firm* — Birch, Stewart, Kolasch & Birch, LLP

(57) ABSTRACT

The present disclosure relates to a method for manufacturing an electrode including a polymer electrolyte and an electrode obtained thereby. Particularly, the present disclosure relates to an electrode for a wide voltage battery which has improved reactivity on the surface of the electrode active material. The electrode provides an increased reactive site between an electrode active material and a polymer electrolyte and an improved ratio of the amount of active material in the electrode, and thus can provide a battery with improved energy density.

7 Claims, 2 Drawing Sheets

(51) Int. Cl.
  *H01M 4/13* (2010.01)
  *H01M 4/139* (2010.01)
  *H01M 10/0565* (2010.01)
  *H01M 4/1391* (2010.01)
  *H01M 4/131* (2010.01)
  *H01M 4/525* (2010.01)
  *H01M 4/62* (2006.01)
  *H01M 10/052* (2010.01)

(52) U.S. Cl.
  CPC ............. *H01M 4/13* (2013.01); *H01M 4/131* (2013.01); *H01M 4/139* (2013.01); *H01M 4/1391* (2013.01); *H01M 4/525* (2013.01); *H01M 4/62* (2013.01); *H01M 10/0565* (2013.01); *H01M 4/0407* (2013.01); *H01M 10/052* (2013.01); *H01M 2300/0082* (2013.01)

(56) References Cited

U.S. PATENT DOCUMENTS

| 2005/0037262 | A1 | 2/2005 | Vallee et al. |
| 2005/0064289 | A1 | 3/2005 | Suzuki et al. |
| 2008/0020283 | A1 | 1/2008 | Miyashiro et al. |
| 2011/0027661 | A1 | 2/2011 | Okazaki et al. |
| 2011/0281175 | A1 | 11/2011 | Hudson et al. |
| 2012/0110835 | A1* | 5/2012 | Hudson ................ H01M 10/38 29/623.1 |
| 2014/0057180 | A1 | 2/2014 | Iwasaki |
| 2019/0319258 | A1* | 10/2019 | Lee .................... H01M 10/0565 |

FOREIGN PATENT DOCUMENTS

| JP | 11-7942 A | 1/1999 |
| JP | 2003-217594 A | 7/2003 |
| JP | 2004-234879 A | 8/2004 |
| JP | 2005-51125 A | 2/2005 |
| JP | 2007-500926 A | 1/2007 |
| JP | 2009-193940 A | 8/2009 |
| JP | 2012-216347 A | 11/2012 |
| JP | 2012-226854 A | 11/2012 |
| JP | 2013-257992 A | 12/2013 |
| JP | 2016-207418 A | 12/2016 |
| KR | 10-0125150 B1 | 7/1996 |
| KR | 10-2007-0034104 A | 3/2007 |
| KR | 10-1282129 B | 7/2013 |
| KR | 10-2014-0033934 A | 3/2014 |
| KR | 10-2015-0136397 A | 12/2015 |
| WO | WO 2012/157046 A1 | 11/2012 |

OTHER PUBLICATIONS

Kim et al., "The Effect of Some Nitriles as Electrolyte Additives in Li-Ion Batteries", Journal of the Electrochemical Society, 162 (3) A437-A447 (2015).

* cited by examiner

FIG. 1 – Related Art
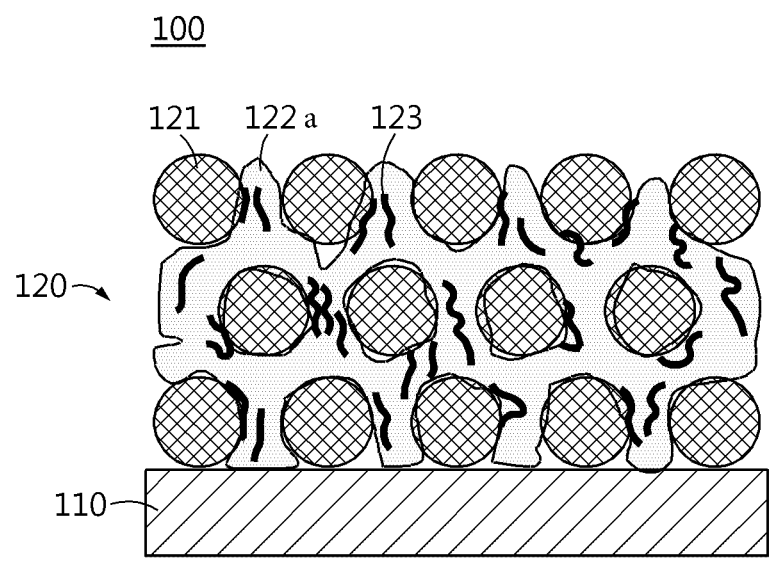
FIG. 2 – Related Art
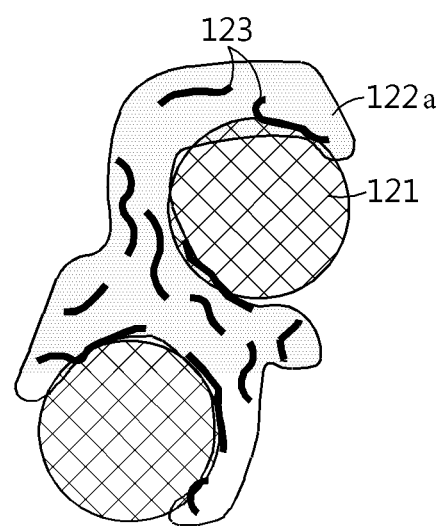

METHOD FOR MANUFACTURING ELECTRODE INCLUDING POLYMER ELECTROLYTE AND ELECTRODE OBTAINED THEREBY

TECHNICAL FIELD

The present application claims priority to Korean Patent Application No. 10-2017-0028342 filed on Mar. 6, 2017 and Korean Patent Application No. 10-2017-0029660 filed on Mar. 8, 2017 in the Republic of Korea, the disclosures of which are incorporated herein by reference. The present disclosure relates to a method for manufacturing an electrode including a polymer electrolyte and an electrode obtained thereby. Particularly, the present disclosure relates to a method for manufacturing an electrode for a wide voltage battery which has improved reactivity on the surface of the electrode active material, and an electrode obtained thereby.

BACKGROUND ART

A lithium ion battery using a liquid electrolyte includes a negative electrode and a positive electrode divided by a separator, and thus may cause a short-circuit when the separator is damaged by deformation or external impact, which may lead to dangerous situations, such as overheating or explosion. Therefore, development of a polymer electrolyte capable of ensuring safety may be an important subject in the field of lithium ion secondary batteries.

A lithium secondary battery using a polymer electrolyte provides increased safety to a lithium ion battery, prevents leakage of an electrolyte to provide improved reliability of a battery and facilitates manufacture of a thin battery, and thus is expected to be applied to a high-capacity secondary battery for electric vehicles as well as a compact secondary battery. Therefore, such a lithium secondary battery has been given many attentions as a next-generation battery.

However, a lithium secondary battery using a polymer electrolyte shows lower ion conductivity as compared to a liquid electrolyte and provides low output characteristics particularly at low temperature. In addition, since a solid electrolyte shows lower adhesion to the surface of an active material as compared to a liquid electrolyte, and thus provides increased interfacial resistance. The solid electrolyte is distributed while not being in contact with an electrode active material so that the output characteristics or capacity characteristics may be degraded as compared to the amount of a conductive material introduced to a battery. Further, an electrode using a solid polymer electrolyte has a lower content of active material in the electrode as compared to an electrode for a battery using a liquid electrolyte. Thus, it is required to increase the ratio of an active material to accomplish high energy density. Additionally, the portion of polymer electrolyte that is in direct contact with an electrode active material may be affected by the redox reaction of the electrode active material. In the case of a polymer electrolyte, it has lower redox stability and fluidity as compared to a liquid electrolyte and is fixed in its position, and thus the above-mentioned effects may be concentrated at a specific portion continuously to accelerate deterioration of the electrolyte. Therefore, there has been a limitation in developing a wide voltage battery by using a solid electrolyte according to the related art. FIG. 1 shows an electrode for a solid state battery including a solid polymer electrolyte according to the related art, and FIG. 2 is a schematic view illustrating partially enlarged FIG. 1. Referring to FIG. 1 and FIG. 2, the conductive material is contained in the solid electrolyte but a part of the solid electrolyte introduced to the battery cannot be in direct contact with the active material but is spaced apart from the active material since it has no fluidity. The remaining conductive material cannot participate directly in the electrochemical reaction upon the driving of the battery to cause degradation of output characteristics or capacity. For this reason, when using such a solid electrolyte, it is not possible to realize the capacity of the electrode sufficiently, unlike the electrode using a liquid electrolyte. As a result, the electrode using such a solid electrolyte provides a capacity lower than the designed or theoretical capacity.

DISCLOSURE

Technical Problem

The present disclosure is designed to solve the problems of the related art, and therefore the present disclosure is directed to providing an electrode which shows an increased reactive site between an electrode active material and a polymer electrolyte, and has an improved ratio of the content of an active material in the electrode to provide improved energy density. The present disclosure is also directed to providing an electrode which is prevented from reduction and oxidation and thus shows improved electrochemical stability. In addition, the present disclosure is directed to providing a method for manufacturing the electrode having the above-mentioned technical characteristics.

Technical Solution

The present disclosure provides an electrode for a solid state battery to solve the above-mentioned technical problems, and a method for manufacturing the electrode. According to a first embodiment of the present disclosure, there is provided an electrode including a plurality of electrode active material particles, a binder and/or a first polymer electrolyte, a second polymer electrolyte and a conductive material, wherein the electrode active material particles are at least partially surface-coated with a first coating layer including a mixture of the first polymer electrolyte and the conductive material, the second polymer electrolyte at least partially covers the surface of the first coating layer, the surface of the particles or both the surface of the first coating layer and the surface of the electrode active material particles, and the electrode active material particles are bound to each other by at least one of the first polymer electrolyte and the second polymer electrolyte to form an integrated structure.

According to a second embodiment, there is provided the electrode of the first embodiment, wherein the first polymer electrolyte and the second electrolyte are the same or different.

According to a third embodiment, there is provided the electrode of the first embodiment or the second embodiment, wherein the first polymer electrolyte is different from the second polymer electrolyte.

According to a fourth embodiment, there is provided the electrode of any one of the first to the third embodiments, wherein the first coating layer further includes at least one additive selected from the group consisting of an oxidation stabilizer additive, a reduction stabilizer additive, a flame retardant, a heat stabilizer and an anti-fogging agent.

According to a fifth embodiment, there is provided a method for manufacturing the electrode of the present disclosure, including the steps of: (S10) preparing a first slurry including a first mixture containing a first polymer electrolyte, a conductive material and a plurality of electrode active material particles; (S20) coating a surface of a current collector with the first slurry; and (S30) impregnating the product of (S20) with a second slurry including a second polymer electrolyte.

According to a sixth embodiment, there is provided the method of the fifth embodiment, wherein a product of (S20) includes the electrode active material particles at least partially surface-coated with the first polymer electrolyte.

According to a seventh embodiment, there is provided the method of the fifth or the sixth embodiment, wherein the first mixture further includes at least one additive selected from the group consisting of an oxidation stabilizer additive, a reduction stabilizer additive, a flame retardant, a heat stabilizer and an anti-fogging agent.

According to an eighth embodiment, there is provided the method of any one of the fifth to the seventh embodiments, which further includes step (S40) of drying a product obtained from (S30), wherein a product of (S40) is an electrode in which the electrode active material particles are bound to each other by at least one of the first polymer electrolyte and the second polymer electrolyte to form an integrated structure.

Advantageous Effects

The electrode according to the present disclosure includes a conductive material disposed on the surface of the electrode active material so that it does not remain in the non-reactive region. Thus, even when using a small amount of conductive material, it is possible to provide high electroconductivity and to reduce the amount of the conductive material. In addition, since the conductive material is disposed effectively, it is possible to improve the electroconductivity, and to avoid a need for carrying out pressing under a severe condition in order to reduce the porosity of the electrode and to increase the contact area between the electrode and the polymer electrolyte during the pressing. Therefore, it is possible to solve the problem of breakage and damage of the electrode active material occurring under high pressure. In addition, the electrode according to the present disclosure has improved electroconductivity and provides improved output characteristics when it is applied to a battery. Finally, the electrode according to the present disclosure includes an anti-oxidizing agent and anti-reducing agent, and thus prevents deterioration of the polymer electrolyte caused by the redox reaction of the electrode active material.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shapes, sizes, scales or ratios of the elements in the accompanying drawing may be exaggerated for the purpose of more clear description.

FIG. 1 and FIG. 2 are schematic views illustrating the distribution of a conductive material in the electrode including a polymer electrolyte according to the related art.

BEST MODE

Figure 3:
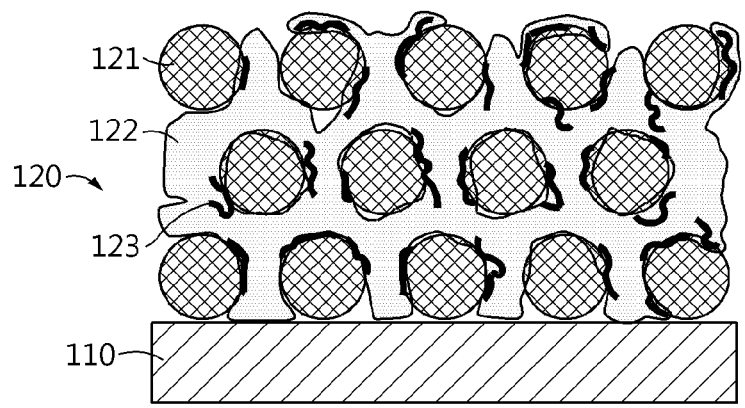
FIG. 3 and FIG. 4 illustrate the structure of the electrode and partially enlarged electrode active material layer according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

It will be understood that the terms "comprises" and/or "comprising", or "includes" and/or "including" when used in this specification, refer to the presence of any stated element, but do not preclude the addition of one or more other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

In the following specification, specific terms are used for convenience and are not limiting. Such terms as 'right'. 'left' 'top surface' and 'bottom surface' refer to the directions as shown in the drawings to which reference is made. Such terms as 'internally' and 'externally' refer to the directions toward or away from the geometrical centers of the designated devices, systems and members thereof. The terms 'front', 'rear', 'up', 'down' and related words and phrases refer to the locations and bearings in the drawing to which reference is made and are not limiting. The same is also applied to the above-listed words, derivatives thereof and synonyms thereof.

The present disclosure relates to a method for manufacturing an electrode for a lithium ion secondary battery and an electrode obtained thereby. As used herein, the lithium ion secondary battery is a solid state battery using a polymer electrolyte as an electrolyte. Herein, the solid state battery may also be referred to as a lithium polymer secondary battery or lithium ion polymer secondary battery.

According to the present disclosure, the electrode includes a plurality of electrode active material particles, a first polymer electrolyte, a second polymer electrolyte and a conductive material. In addition, the electrode may further include a binder if desired. The electrode may further include various additives to supplement or improve the physicochemical properties thereof, if desired. The additives are not particularly limited but may include at least one additive such as an oxidation stabilizer additive, reduction stabilizer additive, flame retardant, heat stabilizer and an anti-fogging agent.

Figure 4:
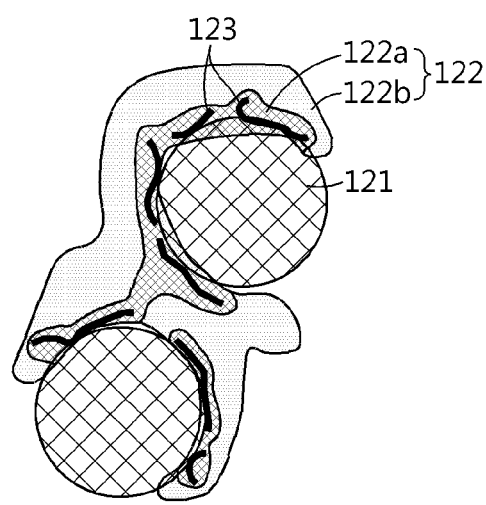

According to an embodiment of the present disclosure, the electrode active material particles are at least partially surface-coated with a first coating layer including a mixture of a binder and/or a first polymer electrolyte and a conductive material. Meanwhile, according to an embodiment of the present disclosure, the first coating layer may further include at least one of the above-mentioned additives. In addition, the second polymer electrolyte at least partially covers the surface of the first coating layer, the surface of the particles or both surfaces. In other words, the second polymer electrolyte forms a second coating layer. In the electrode according to the present disclosure, the electrode active material particles are bound to each other by at least one of the first polymer electrolyte and the second polymer electrolyte to form an integrated structure. FIG. 4 is a partially enlarged view illustrating the electrode according to the present disclosure, wherein the first coating layer is formed on the surface of the electrode active material particles, and the second coating layer is formed on the surface of the electrode active material particles coated with the first coating layer. In addition, the conductive material is contained in the first coating layer so that it may be distributed very closely to the periphery of the active material. Therefore, the distance between the conductive material and the electrode active material is minimized and the contact frequency between them is increased.

In addition, according to the present disclosure, the electrode may include a current collector. For example, the integrated electrode structure may be formed on one surface of the current collector. In other words, the electrode according to the present disclosure has an electrode active material layer including the first polymer electrolyte, the second polymer electrolyte and the conductive material and formed on at least one surface of the current collector, wherein the electrode active material layer has the electrode structure as described above. Additionally, as described above, the electrode active material layer may further include a binder resin and additives, if desired.

According to the present disclosure, the electrode may be any one of a negative electrode(anode) and a positive electrode(cathode). When the electrode is a negative electrode, it may include any electrode active material that can be used as a negative electrode active material for a lithium ion secondary battery. For example, the negative electrode active material may include any one selected from: carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0 \leq x \leq 1$; $1 \leq y \leq 3$; $1 \leq z \leq 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; lithium titanium oxide; or the like, or a combination of two or more of them. According to a particular embodiment, the negative electrode active material may include a carbonaceous material and/or Si.

When the electrode is a positive electrode, it may include any electrode active material that can be used as a positive electrode active material for a lithium ion secondary battery. For example, the positive electrode active material may include, but is not limited to: a layered compound such as lithium cobalt oxide ($LiCoO_2$) or lithium nickel oxide ($LiNiO_2$), or a compound substituted with one or more transition metals; lithium manganese oxide such as $Li_{1+x}Mn_{2-x}O_4$ (wherein x is 0-0.33), $LiMnO_3$, $LiMn_2O_3$ or $LiMnO_2$; lithium copper oxide ($Li_2CuO_2$); vanadium oxide, such as $LiV_3O_8$, $LiFe_3O_4$, $V_2O_5$, $Cu_2V_2O_7$, or the like; Ni-site type lithium nickel oxide represented by the chemical formula of $LiNi_{1-x}M_xO_2$ (wherein M=Co, Mn, Al, Cu, Fe, Mg, B or Ga, and x=0.01-0.3); lithium manganese composite oxide represented by the chemical formula of $LiMn_{2-x}M_xO_2$ (wherein M=Co, Ni, Fe, Cr, Zn or Ta, and x=0.01-0.1) or $Li_2Mn_3M_xO_8$ (wherein M=Fe, Co, Ni, Cu or Zn); spinel-type lithium manganese composite oxide $LiNi_xMn_{2-x}O_4$; $LiMn_2O_4$ in which a part of Li is substituted with alkaline earth metal ions; disulfide compound; $Fe_2(MoO_4)_3$, or the like.

According to the present disclosure, the current collector shows electroconductivity and an adequate current collector may be used depending on the polarity of the collector electrode known to the field of secondary batteries.

According to the present disclosure, the conductive material is added in an amount of 0-30 wt % or 1-30 wt % based on the total weight of the mixture including the electrode active material. The conductive material is not particularly limited, as long as it has conductivity while not causing any side reaction with the other elements of the battery. Particular examples of the conductive material include any one selected from: graphite, such as natural graphite or artificial graphite; carbon black, such as carbon black, acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; metal oxides, such as titanium oxide; conductive materials, such as polyphenylene derivatives; or the like, or a combination of two or more of them.

According to the present disclosure, the first coating layer includes a mixture of the first polymer electrolyte and the conductive material and at least partially covers the surface of the electrode active material particles. In addition, according to an embodiment of the present disclosure, the first coating layer may further include a binder and/or various additives.

In other words, the particles in the electrode active material layer are integrated in such a manner that they are bound to each other in a point-point and/or surface-surface manner mostly by means of the second polymer electrolyte to form an integrated electrode. In addition, the particles are preliminarily coated with the first coating layer partially or totally on the surface thereof. Thus, since the particles are coated with the first coating layer and the conductive material contained in the electrode are disposed and concentrated around the surface of the electrode active material, it is possible to increase the reactive site between the active material and the solid electrolyte. In addition, it is possible to reduce the amount of the conductive material.

According to the present disclosure, the binder is an ingredient which assists the binding of an active material with a conductive material, or the like, and the binding to a collector. Particular examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like. In general, the binder is added in an amount of 1-30 wt % based on the total weight of the mixture including the negative electrode active material.

According to the present disclosure, the first polymer electrolyte and the second polymer electrolyte may be the same or different. The first polymer electrolyte covers the surface of the particles primarily and preferably has a broad potential window. For example, in the case of a positive electrode, the first polymer electrolyte is a polymer electrolyte having excellent oxidation stability preferably. In addition, in the case of a negative electrode, it is preferred to use a polymer electrolyte having excellent reduction stability as the first polymer electrolyte. According to an embodiment of the present disclosure, the second polymer electrolyte may be the same as or different from the above-mentioned first polymer electrolyte. Since the second polymer electrolyte mainly functions to transport lithium ions in an electrode, it may be any material having high ion conductivity, for example an ion conductivity of $10^{-4}$ s/m or more, and is not particularly limited. According to an embodiment of the present disclosure, the first polymer electrolyte may be suitably different from the second polymer electrolyte in order to supplement the characteristics of the electrode and to realize the characteristics of the electrode active material particles.

According to the present disclosure, each of the first polymer electrolyte and the second polymer electrolyte may be a solid polymer electrolyte formed by adding a polymer resin to a solvated lithium salt, or a polymer gel electrolyte including a polymer resin impregnated with an organic electrolyte containing an organic solvent and a lithium salt.

According to an embodiment of the present disclosure, the solid polymer electrolyte is not particularly limited, and any polymer material may be used as long as it has ion conductivity and includes a polymer material used generally as a solid electrolyte material for a solid state battery. Particular examples of the polymer material may include a polyether polymer, polycarbonate polymer, acrylate polymer, polysiloxane polymer, phosphazene polymer, polyethylene derivative, alkylene oxide derivative, phosphate polymer, polyagitation lysine, polyester sulfide, polyvinyl alcohol, polyvinylidene fluoride, polymer containing an ionically dissociatable group, or the like. According to an embodiment of the present disclosure, the solid polymer electrolyte may include a polymer resin, such as a branched copolymer including polyethylene oxide (PEO) backbone copolymerized with a comonomer including an amorphous polymer, such as PMMA, polycarbonate, polydiloxane (pdms) and/or phosphazene, comb-like polymer, crosslinked polymer resin, or the like.

According to an embodiment of the present disclosure, the polymer gel electrolyte includes a lithium salt-containing organic electrolyte and a polymer resin, wherein the organic electrolyte is used in an amount of 60-400 parts by weight based on the weight of the polymer resin. There is no particular limitation in the polymer used for the gel electrolyte, and particular examples of the polymer include PVC polymers, PMMA polymers, polyacrylonitrile (PAN), polyvinylidene fluoride (PVdF), poly(vinylidene fluoride-co-hexafluoropropylene (PVdF-HFP), or the like.

In the electrolyte according to the present disclosure, the lithium salt is an ionizable lithium salt and may be represented by $Li^+X^-$. There is no particular limitation in the anion of the lithium salt and particular examples thereof include: $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

Meanwhile, according to an embodiment of the present disclosure, the second polymer electrolyte may be a polymer gel electrolyte. The polymer gel electrolyte has excellent ion conductivity ($10^{-3}$ s/m or more) and shows bindability, thereby providing a function not only as an electrolyte but also as an electrode binder which imparts binding force among the electrode active material particles and between the electrode active material layer and the current collector.

According to the present disclosure, any oxidation stabilizer additive may be used with no particular limitation, as long as it prevents oxidation of the polymer electrolyte or delays oxidation rate. According to an embodiment of the present disclosure, the anti-oxidizing agent may be at least one selected from nitrile-, boron-, phenol-, sulfur-/phosphorus-, metallocene- and quinone-based anti-oxidizing agents. In addition, according to the present disclosure, the electrode may be a positive electrode, particularly.

According to the present disclosure, any reduction stabilizer additive may be used with no particular limitation, as long as it prevents reduction of the polymer electrolyte or delays reduction rate. According to an embodiment of the present disclosure, the anti-reducing agent may be at least one selected from carbonate-, sulfur- and lithium salt-based anti-reducing agents. In addition, according to the present disclosure, the electrode may be a negative electrode, particularly.

Hereinafter, the method for manufacturing the above-described electrode will be explained. The method described hereinafter is one of the methods applicable to manufacture of the electrode according to the present disclosure.

First, a first slurry including a first mixture containing a first polymer electrolyte and a conductive material is prepared. The first mixture may further include a binder resin and/or additives. A polymer material for a solid electrolyte and a lithium salt are melted at high temperature to prepare a melt blend or a dispersion containing a polymer material and a lithium salt dispersed homogeneously in an organic solvent is prepared. Then, the conductive material is added to the blend or dispersion and mixed therewith. After that, an electrode active material is introduced to the blend or dispersion to prepare the first slurry.

Herein, the first slurry includes the polymer electrolyte in an amount of 1-100 parts by weight, 2-50 parts by weight, 2-20 parts by weight, or 2-10 parts by weight, based on 100 parts by weight of the electrode active material. According to an embodiment of the present disclosure, the oxidation stabilizer is used in an amount of 0.1-20 parts by weight, particularly 1-10 parts by weight, based on 100 parts by weight of the electrode active material.

However, the method for preparing the first slurry is for illustrative purposes only and the scope of the present disclosure is not limited thereto. Particularly, the order of introducing or mixing the ingredients of the first slurry may be modified considering the physicochemical properties of the ingredients and the characteristics of the electrode or battery to be obtained. For example, the polymer electrolyte, conductive material and the electrode active material may be introduced to a dispersion medium, such as a solvent, at different times or at the same time.

Then, the first slurry is applied to at least one surface of a current collector, followed by drying. In this step, the electrode active material particles are at least partially surface-coated with the first coating layer containing the first polymer electrolyte. Since the first coating layer is formed on the surface of the particles, the whole of the conductive material introduced to the electrode is disposed in such a manner that it may be in contact with the electrode active material particles sufficiently.

The drying may be carried out under vacuum and the temperature is preferably controlled at a temperature between room temperature (about 20° C.) and 150° C. In addition, if desired, it is possible to carry out a pressurization step after the drying step. The pressurization step performs packing of the ingredients of the electrode so that the electrode may have an adequate level of porosity, and is not limited to a particular method. For example, any known pressurization methods, such as hot pressing or rolling, may be selected adequately. If desired, the pressurization may be controlled under a suitable temperature condition through heating or cooling.

After that, the dried product of the particles coated with the first coating layer is impregnated with a second slurry containing a second polymer electrolyte.

In this step, the second slurry may be prepared in a liquid phase, like the first slurry. In other words, the second slurry may be prepared by melting a polymer material for a solid electrolyte and a lithium salt at high temperature to prepare a melt blend or dispersing a polymer material and a lithium salt homogeneously in an organic solvent to prepare a dispersion. The dried product is impregnated with the second slurry so that it may be packed with the second slurry. The second slurry infiltrates into the pores of the dried product so that the vacant spaces (voids) of the electrode may be filled with the polymer electrolyte.

During this step, the voids between the electrode active material particles are filled with the polymer electrolyte, and thus the resistance of the electrode active material and the polymer electrolyte is reduced, the area of the electrochemically reactive site is increased and lithium ion conductivity is improved, resulting in improvement of the performance of a battery.

Then, the impregnated electrode is dried. After drying, a pressing step may be further carried out as necessary. The pressing step may be carried out adequately through at least one process selected from hot pressing and cold pressing.

According to an embodiment of the present disclosure, the finished electrode has a porosity of 3-50% or 5-20%.

In the electrode obtained by the method, the active material is coated with the first coating layer and the coated active material particles are bound to each other in a point-point or surface-surface manner by the first polymer electrolyte and/or the second polymer electrode to form an integrated electrode structure. In other words, the electrode active material is coated twice with the polymer electrolytes, and the conductive material is incorporated to the first coating layer upon the first coating to increase the availability of the conductive material.

FIG. 1 and FIG. 2 are schematic views illustrating the electrode obtained by the conventional method. According to the related art, an active material, a solid electrolyte and a conductive material are mixed at once to obtain an electrode slurry, which, in turn, is coated onto a current collector to provide an electrode.

In this case, the conductive material is also disposed in a non-reactive region where no electrochemical reaction occurs, and thus a significant amount of the conductive material introduced to the electrode cannot participate in the reaction. For this, there is a disadvantage in that the availability of the conductive material is low. To solve the problem, it is required to carry out a pressing process including pressing the electrode surface under the condition of high pressure after coating the electrode so that the contact area between the electrode active material and the solid electrolyte may be increased. However, there is a problem in that the active material is broken due to the high pressure applied during the pressing process to cause degradation of the capacity of a battery.

FIG. 3 and FIG. 4 are schematic view illustrating the electrode according to the present disclosure. Referring to FIG. 3 and FIG. 4, the conductive material and/or oxidation stabilizer additive are disposed closely to the surface of the electrode active material and participate in the electrochemical reaction at a high ratio. Thus, it is possible to reduce the amount of the conductive material and additives. In addition, even when no severe pressure is applied during the pressing, reactive sites can be ensured sufficiently to prevent deterioration of the electrode.

In another aspect, the present disclosure provides a lithium ion secondary battery including at least one electrode as described above. The battery is provided with a positive electrode, a negative electrode and a polymer electrolyte membrane interposed between the positive electrode and the negative electrode. The negative electrode and/or the positive electrode may be the above-described electrode and may include a polymer electrolyte.

According to the present disclosure, the polymer electrolyte membrane is interposed between the negative electrode and the positive electrode and functions not only to electrically insulate the negative electrode from the positive electrode but also to conduct lithium ions therethrough. Any polymer electrolyte membrane used conventionally in the field of solid state batteries may be used with no particular limitation. According to an embodiment of the present disclosure, the polymer electrolyte membrane is provided in the form of a film or membrane and may include at least one of the first polymer electrolyte and the second polymer electrolyte.

In still another aspect, the present disclosure provides a battery module including the secondary battery as a unit cell, a battery pack including the battery module, and a device including the battery pack as an electric power source.

Herein, particular examples of the device may include but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be explained in more detail. The following examples are for illustrative purposes only and the scope of the present disclosure is not limited thereto.

EXAMPLES: MANUFACTURE OF ELECTRODE AND BATTERY

Example 1

(1) Manufacture of Electrode

To form a slurry, NCM811 ($LiNi_{0.8}Co_{0.1}Mn_{0.1}O_2$) as an electrode active material, VGCF as a conductive material and a first polymer solid electrolyte (PEO+LiFSI, molar ratio 20:1) were mixed at a weight ratio of 90:5:5. The resultant mixture was introduced to and agitated with acetonitrile to form an electrode slurry. A copper current collector having a thickness of 20 μm was prepared, and then the slurry was applied to the current collector and vacuum dried at 120° C. for 4 hours. Then, a pressing process was carried out to obtain an electrode having an electrode loading of 2 mAh/cm$^2$, an electrode active material layer thickness of 48 μm and a porosity of 25%. In this manner, a structure including the active material surface-coated with the conductive material and the solid electrolyte was formed. Meanwhile, to improve the ion conductivity in the electrode, a second polymer solid electrolyte (PEO+LiFSI, molar ratio 20:1) solution was prepared, and then the electrode obtained as described above was impregnated with the solution and vacuum dried at 120° C. for 4 hours. After the impregnation, a finished electrode having a porosity of 10% was obtained.

(2) Manufacture of Battery

An electrode cut into a circular shape of 1.4875 cm$^2$ and lithium metal foil cut into a circular shape of 1.7671 cm$^2$ as a counter electrode were used to obtain a coin-type half-cell. Particularly, a 50 μm solid electrolyte membrane (PEO+LiFSI, molar ratio 20:1) was interposed between the electrode and lithium metal to form an electrode assembly, which, in turn, was fabricated into a coin cell.

Example 2

An electrode and a battery were manufactured in the same manner as Example 1, except that NCMSII ($LiNi_{0.8}Co_{0.1}Mn_{0.1}O_2$) as an electrode active material, VGCF as a conductive material and a first polymer solid electrolyte (PEO+LiFSI, molar ratio 20:1) were mixed at a weight ratio of 90:3:7.

Example 3

An electrode and a battery were manufactured in the same manner as Example 1, except that NCM811 ($LiNi_{0.8}Co_{0.1}Mn_{0.1}O_2$) as an electrode active material, Super C as a conductive material and a first polymer solid electrolyte (PEO+LiFSI, molar ratio 20:1) were mixed at a weight ratio of 90:3:7.

Example 4

An electrode and a battery were manufactured in the same manner as Example 1, except that NCM811 ($LiNi_{0.8}Co_{0.1}Mn_{0.1}O_2$) as an electrode active material, VGCF as a conductive material and a first polymer solid electrolyte (polypropylene carbonate (PPC)+LiFSI, molar ratio 20:1) were mixed at a weight ratio of 90:3:7.

Example 5

An electrode and a battery were manufactured in the same manner as Example 1, except that NCM811 ($LiNi_{0.8}Co_{0.1}Mn_{0.1}O_2$) as an electrode active material, VGCF as a conductive material and a first polymer solid electrolyte (polymethylhydrosiloxane (PMHS)+LiFSI, 30 wt % Li salt) were mixed at a weight ratio of 90:3:7.

Example 6

An electrode and a battery were manufactured in the same manner as Example 1, except that NCM811 ($LiNi_{0.8}Co_{0.1}Mn_{0.1}O_2$) as an electrode active material, VGCF as a conductive material, a first polymer solid electrolyte (PEO+LiFSI, molar ratio 20:1) and succinonitrile (SN) as an oxidation stabilizer were mixed at a weight ratio of 90:3:6.5:0.5.

Example 7

An electrode and a battery were manufactured in the same manner as Example 1, except that NCM811 ($LiNi_{0.8}Co_{0.1}Mn_{0.1}O_2$) as an electrode active material, VGCF as a conductive material, a first polymer solid electrolyte (PEO+LiFSI, molar ratio 20:1) and succinonitrile (SN) as an oxidation stabilizer were mixed at a weight ratio of 90:3:6:1.

Example 8

An electrode and a battery were manufactured in the same manner as Example 1, except that artificial graphite as an electrode active material, VGCF as a conductive material and a first polymer solid electrolyte (PEO+LiFSI, molar ratio 20:1) were mixed at a weight ratio of 90:2:8.

Comparative Example 1

(1) Manufacture of Electrode

To form a slurry, NCM811 ($LiNi_{0.8}Co_{0.1}Mn_{0.1}O_2$) as an electrode active material, VGCF as a conductive material and a first polymer solid electrolyte (PEO+LiFSI, molar ratio 20:1) were mixed at a weight ratio of 82:2.8:15.2. The resultant mixture was introduced to and agitated with acetonitrile to form an electrode slurry. A copper current collector having a thickness of 20 μm was prepared, and then the slurry was applied to the current collector and vacuum dried at 120° C. for 4 hours. Then, a pressing process was carried out to obtain an electrode having an electrode loading of 2 $mAh/cm^2$, an electrode active material layer thickness of 48 μm and a porosity of 10%.

(2) Manufacture of Battery

An electrode cut into a circular shape of 1.4875 $cm^2$ and lithium metal foil cut into a circular shape of 1.7671 $cm^2$ as a counter electrode were used to obtain a coin-type half-cell. Particularly, a 50 μm solid electrolyte membrane (PEO+LiFSI, molar ratio 20:1) was interposed between the electrode and lithium metal to form an electrode assembly, which, in turn, was fabricated into a coin cell.

Comparative Example 2

An electrode and a battery were manufactured in the same manner as Comparative Example 1, except that NCM811 ($LiNi_{0.8}Co_{0.1}Mn_{0.1}O_2$) as an electrode active material, VGCF as a conductive material and a first polymer solid electrolyte (PEO+LiFSI, molar ratio 20:1) were mixed at a weight ratio of 82:5.5:12.5.

Comparative Example 3

An electrode and a battery were manufactured in the same manner as Comparative Example 1, except that NCM811 as an electrode active material, VGCF as a conductive material and a first polymer solid electrolyte (PEO/PPC (1:1)+LiFSI, molar ratio 20:1) were mixed at a weight ratio of 82:5.5:12.5.

Comparative Example 4

An electrode and a battery were manufactured in the same manner as Comparative Example 1, except that NCM811 as an electrode active material, VGCF as a conductive material, a first polymer solid electrolyte (PEO+LiFSI, molar ratio 20:1) and an oxidation stabilizer SN were mixed at a weight ratio of 82:5.5:11.5:1.

Comparative Example 5

An electrode and a battery were manufactured in the same manner as Comparative Example 1, except that NCM811 as an electrode active material. VGCF as a conductive material, a first polymer solid electrolyte (PEO+LiFSI, molar ratio 20:1) and an oxidation stabilizer SN were mixed at a weight ratio of 82:5.5:10.5:2.

Comparative Example 6

An electrode and a battery were manufactured in the same manner as Comparative Example 1, except that artificial graphite as an electrode active material, VGCF as a conductive material and a first polymer solid electrolyte (PEO+LiFSI, molar ratio 20:1) were mixed at a weight ratio of 80:3:17.

Test Example 1: Evaluation of Electric Resistance of Active Material Layer in Electrode Each of the electrodes according to Examples 1-3, Example 8 and Comparative Examples 1 and 2 was determined for electric resistance by using an MP tester. The results are shown in the following Tables 1 and 2.

Test Example 2: Evaluation of Initial Discharge Capacity and Life Characteristics Each of the batteries according to Examples 1-8 and Comparative Examples 1-6 was subjected to charging/discharging and the initial discharge capacity and capacity maintenance were evaluated. Meanwhile, to carry out evaluation of life characteristics, charging/discharging was carried out at 60° C. under 0.05 C, the 30$^{th}$ cycle was terminated in a discharged state, and the capacity maintenance was evaluated. Examples 4-7 and Comparative Examples 3-5 were evaluated for 4.25V.

Charging condition: Constant Current (CC)/Constant Voltage (CV) (4.0V or 4.25 V, 0.005 C current cut-off)

Discharging condition: Constant Current (CC) condition 3V

The capacity maintenance was derived by calculating the ratio of the discharge capacity after the 30$^{th}$ cycle based on the first discharge capacity. The results are shown in the following Tables 1 and 2.

Test Example 3: Evaluation of Output Characteristics

Each of the batteries according to Examples 1-3 and Comparative Examples 1 and 2 was evaluated for output characteristics. The capacity at 0.2 C was compared with the capacity at 0.05 C and 4.0V. The results are shown in the following Tables 1 and 2.

The test results are shown in Tables 1 and 2 in brief. When an electrode is manufactured according to the present disclosure to ensure conductivity suitable for an electrode for a solid state battery, the electrode shows a lower electric resistance value as compared to the electrode according to the related art, and thus it can be seen that the initial capacity, life and output characteristics are improved. In addition, such improved electroconductivity allows a decrease in the amount of a conductive material and an increase in the amount of solid electrolyte. Thus, it can be also seen that the capacity is improved through the improved ion conductivity. The same effect can be provided regardless of the shape of a conductive material, such as a particle shape or linear shape. In addition, since a PPC or PMHS solid electrolyte stable against high voltage is coated on the surface of an active material, it is possible to increase the capacity of a positive electrode as determined from the positive electrode upper limit voltage of 4.25V increased from 4.0V in the case of PEO and it is also possible to improve the oxidation stability. As another method for improving oxidation stability, SN is added as an anti-oxidizing additive. In this case, a similar effect of improving oxidation stability can be obtained. The concept of the present disclosure is not limited to a positive electrode but is also applied to a negative electrode.

DESCRIPTION OF DRAWING NUMERALS

100: Electrode
110: Current collector
120: Electrode active material layer
121: Electrode active material particles
122: First and second coating layers
122a: First coating layer 122b: Second coating layer
123: Conductive material

What is claimed is:
1. An electrode for a solid state battery, comprising:
a plurality of electrode active material particles;
a first polymer electrolyte;

TABLE 1

| Example | Electric resistance of active material layer (ohm*cm) | Discharge capacity (mAh/g, 4.0 V) | Discharge capacity maintenance (%, 30 cycle, 4.0 V) | Discharge capacity (mAh/g, 4.25 V) | Discharge capacity maintenance (%, 30 cycle, 4.25 V) | Output characteristics (%, 0.2 C/0.05 C, 4.0 V) |
|---|---|---|---|---|---|---|
| 1 | 11.1 | 135 | 95 | | | 77 |
| 2 | 14.2 | 140 | 94 | 173 | 88 | 73 |
| 3 | 15.0 | 138 | 94 | | | 71 |
| 4 | | 138 | 95 | 179 | 94 | |
| 5 | | 140 | 95 | 180 | 94 | |
| 6 | | 141 | 94 | 180 | 95 | |
| 7 | | 141 | 95 | 181 | 96 | |
| 8 | 0.2 | 344 | 82 | | | |

TABLE 2

| Comp. Ex. | Electric resistance of active material layer (ohm*cm) | Discharge capacity (mAh/g, 4.0 V) | Discharge capacity maintenance (%, 30 cycle, 4.0 V) | Discharge capacity (mAh/g, 4.25 V) | Discharge capacity maintenance (%, 30 cycle, 4.25 V) | Output characteristics (%, 0.2 C/0.05 C, 4.0 V) |
|---|---|---|---|---|---|---|
| 1 | 34.4 | 126 | 89 | | | 61 |
| 2 | 20.8 | 129 | 91 | | | 66 |
| 3 | | 130 | 91 | 173 | 89 | |
| 4 | | 134 | 90 | 175 | 89 | |
| 5 | | 134 | 91 | 177 | 90 | |
| 6 | | 334 | 65 | | | | a second polymer electrolyte; and a conductive material, wherein the electrode active material particles are at least partially surface-coated with a first coating layer comprising a mixture of the first polymer electrolyte and the conductive material, the second polymer electrolyte at least partially covers the surface of the first coating layer, the surface of the particles or both the surface of the first coating layer and the surface of the electrode active material particles, and the electrode active material particles are bound to each other by at least one of the first polymer electrolyte and the second polymer electrolyte to form an integrated structure.

2. The electrode for a solid state battery according to claim 1, wherein the first polymer electrolyte and the second electrolyte are the same or different.

3. The electrode for a solid state battery according to claim 1, wherein the first polymer electrolyte is different from the second polymer electrolyte.

4. The electrode for a solid state battery according to claim 1, wherein the first coating layer further comprises at least one additive selected from the group consisting of an oxidation stabilizer additive, a reduction stabilizer additive, a flame retardant, a heat stabilizer and an anti-fogging agent.

5. An electrochemical device comprising the electrode for a solid state battery according to claim 1.

6. A method for manufacturing an electrode for a solid state battery, comprising the steps of:

(S10) preparing a first slurry comprising a first mixture containing a first polymer electrolyte, a conductive material and a plurality of electrode active material particles;

(S20) coating a surface of a current collector with the first slurry;

(S30) impregnating the product of (S20) with a second slurry comprising a second polymer electrolyte, and (S40) drying a product obtained from (S30), wherein a product of (S40) is an electrode in which the electrode active material particles are bound to each oother by at least one of the first polymer electrolyte and the second plymer electrolyte to form an intergrated structure, wherein a product of (S20) comprises the electrode active material particles at least partially surface-coated with the first ploymer electrolyte.

7. The method for manufacturing an electrode for a solid state battery according to claim 5, wherein the first mixture further comprises at least one additive selected from the group consisting of an oxidation stabilizer additive, a reduction stabilizer additive, a flame retardant, a heat stabilizer and an anti-fogging agent.

* * * * *